(12) United States Patent
Arora

(10) Patent No.: US 6,442,678 B1
(45) Date of Patent: Aug. 27, 2002

(54) METHOD AND APPARATUS FOR PROVIDING DATA TO A PROCESSOR PIPELINE

(75) Inventor: Judge K. Arora, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/224,412

(22) Filed: Dec. 31, 1998

(51) Int. Cl.[7] .................................................. G06F 9/38
(52) U.S. Cl. ...................................... 712/218; 712/234
(58) Field of Search .............................. 712/216, 218, 712/219, 234, 244, 23, 24, 18

(56) References Cited

U.S. PATENT DOCUMENTS

| | | | | |
|---|---|---|---|---|
| 5,592,679 A | * | 1/1997 | Yung ............................ | 712/23 |
| 5,630,157 A | * | 5/1997 | Dwyer, III ..................... | 712/23 |
| 5,832,260 A | * | 11/1998 | Arora .......................... | 712/239 |
| 5,892,936 A | * | 4/1999 | Iran et al. ..................... | 712/216 |
| 5,958,047 A | * | 9/1999 | Panwar et al. ................. | 712/237 |
| 6,185,668 B1 | * | 2/2001 | Arya ........................... | 712/23 |
| 6,253,287 B1 | * | 6/2001 | Green .......................... | 711/125 |

OTHER PUBLICATIONS

Wang et al., "Implementing Precise Interruptions in Pipelined RISC Processors", *IEEE Micro*, vol. 13, iss. 4, pp. 36–43, Aug. 1993.*

Smith et al., "Implementation of Precise Interrupts in Pipelined Processors", International Conference of Computer Architecture: 25 Years of International Symposia on Computer Architecture (Selected papers), ACM, pp. 291–299, 1998.*

* cited by examiner

*Primary Examiner*—William M. Treat
(74) *Attorney, Agent, or Firm*—David J. Kaplan

(57) ABSTRACT

In one method, a processor comprises both a speculative register file to store speculative register values and an architectural register file to store architectural register values. An output of the architectural register file is coupled to an input of the speculative register file to update the speculative register file when a misspeculation is detected.

18 Claims, 4 Drawing Sheets

METHOD AND APPARATUS FOR PROVIDING DATA TO A PROCESSOR PIPELINE

FIELD OF THE INVENTION

The present invention relates to computer systems and more particularly to reducing the bypass network in the pipeline of a processor by providing data from a speculative register file.

BACKGROUND OF THE INVENTION

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. Increasing the speed at which instructions are executed tends to increase the computational power of the computer. Processor designers employ many different techniques to increase processor speed to create more powerful computers for consumers. One such technique is to implement a pipeline in a processor.

A pipeline is an assembly line for instructions. When an instruction is issued to a processor pipeline, the instruction is progressively processed through separate stages in the pipeline. At any given moment, the pipeline may contain many instructions, each at different stages of processing at different stages in the pipeline.

After the processor has finished executing an instruction and has ensured that all prior instructions will also complete, the instruction is "retired." This means that the result of the instruction may be stored in an architectural register file (i.e. committed to an architectural state) for later use as a source of a subsequently processed instruction. The stage at which an instruction is retired (often called a retirement or write-back stage and collectively referred to herein as a retirement stage) may be several stages beyond the stage at which the result of the instruction has been calculated by the processor (such as an execute stage).

The reason for the delay in retirement is that the register values are considered speculative until predictions or assumptions (i.e. "speculations") made by the processor during processing of the instruction are verified to be correct. For example, an explicit prediction occurs if a processor makes a branch prediction. The processor may make this branch prediction at the front end of the pipeline, process a sequence of instructions beginning at the predicted instruction address, and resolve the branch prediction at the back end of the pipeline. All the register value results calculated by the processor during execution of the predicted sequence of instructions are considered speculative. This speculative data becomes architectural if the branch prediction is determined to have been correct, and only at that point is the architectural register file updated with the data.

If the prediction is determined to have been incorrect (i.e. mispredicted or misspeculated), then the speculative data may be erroneous. As a result, the speculative data may be flushed from the pipeline, and the processor begins executing a new sequence of instructions beginning at the correct instruction address. Other predictions may be implicit, such as implicitly predicting that no prior instructions take an exception. There are many other types of speculations that modern processors make.

The execution of one instruction in a pipeline may depend on the execution of one or more previously issued instructions. If data from a first instruction in a pipeline is needed by a second instruction in the pipeline, then the unavailability of the data from the first instruction causes a delay in the execution of the second instruction. To avoid the delay associated with updating the architectural register file with new data, and subsequently reading that data for use as source data of subsequently processed instructions, a bypass network may be implemented. A bypass network is used to pass speculative result data from later pipeline stages (i.e. closer to the retirement stage or "backend" of the pipeline), to a earlier stage (such as a register read stage) of the pipeline, bypassing the architectural register file. The register read stage provides source data to datapaths of later pipeline stages for use in determining the result.

Unfortunately, due to the increasing number of instructions that can be executed in parallel in a processor, and the increasing number of pipeline stages between the register read stage and the retirement stage, the bypass network is becoming increasingly complex. Large multiplexers are required to support the bypass network. For example, at least one multiplexer is required for each source data of each instruction that could require source data in a given clock cycle in the pipeline. Each of these multiplexers includes a number of legs equal to at least the number of stages between the register read stage and the retirement stage times the number of results of each instruction that could generate a result in the given clock cycle. Consequently, the size, cost, and speed of the processor may be significantly degraded by this large and complex bypass network.

SUMMARY OF THE INVENTION

For one embodiment of the present invention, a processor comprises both a speculative register file and an architectural register file. An output of the architectural register file is coupled to an input of the speculative register file to update the speculative register file when a misspeculation is detected.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a processor comprises both a speculative register file (SRF) and an architectural register file (ARF). The SRF stores speculative register values shortly after the values are determined, such as within one clock cycle. For this example, only one clock cycle's worth of result data may need to be bypassed from an initial result stage back to an earlier stage of the pipeline as source data for subsequent instructions. The result data that is passed through all subsequent stages may be provided from the single SRF via the bypass network rather than directly from the multiple stages. Consequently, the size and complexity of the bypass network may be reduced.

The ARF is updated with architectural result data upon retirement of the associated instructions, typically several stages (or clock cycles) after the SRF is updated with the speculative result data of the same instructions. Even if a misspeculation is made by the processor, the ARF still contains the correct architectural data. Therefore, in case of a misspeculation, the pipeline may be flushed and the SRF is updated with the architectural data stored in the ARF.

A more detailed description of embodiments of the present invention, including various configurations and implementations, is provided below. As used herein, a single pipeline stage is assumed to take approximately one clock cycle, however it is to be understood that any pipeline stage may take any number of clock cycles. Alternatively, multiple pipeline stages may be completed with a single clock cycle. Note that the terms "value" and "data" may be used interchangeably when referring to sources (or operands) that are used or consumed (or read) by an instruction, and results produced (or written to) by an instruction.

Figure 1:
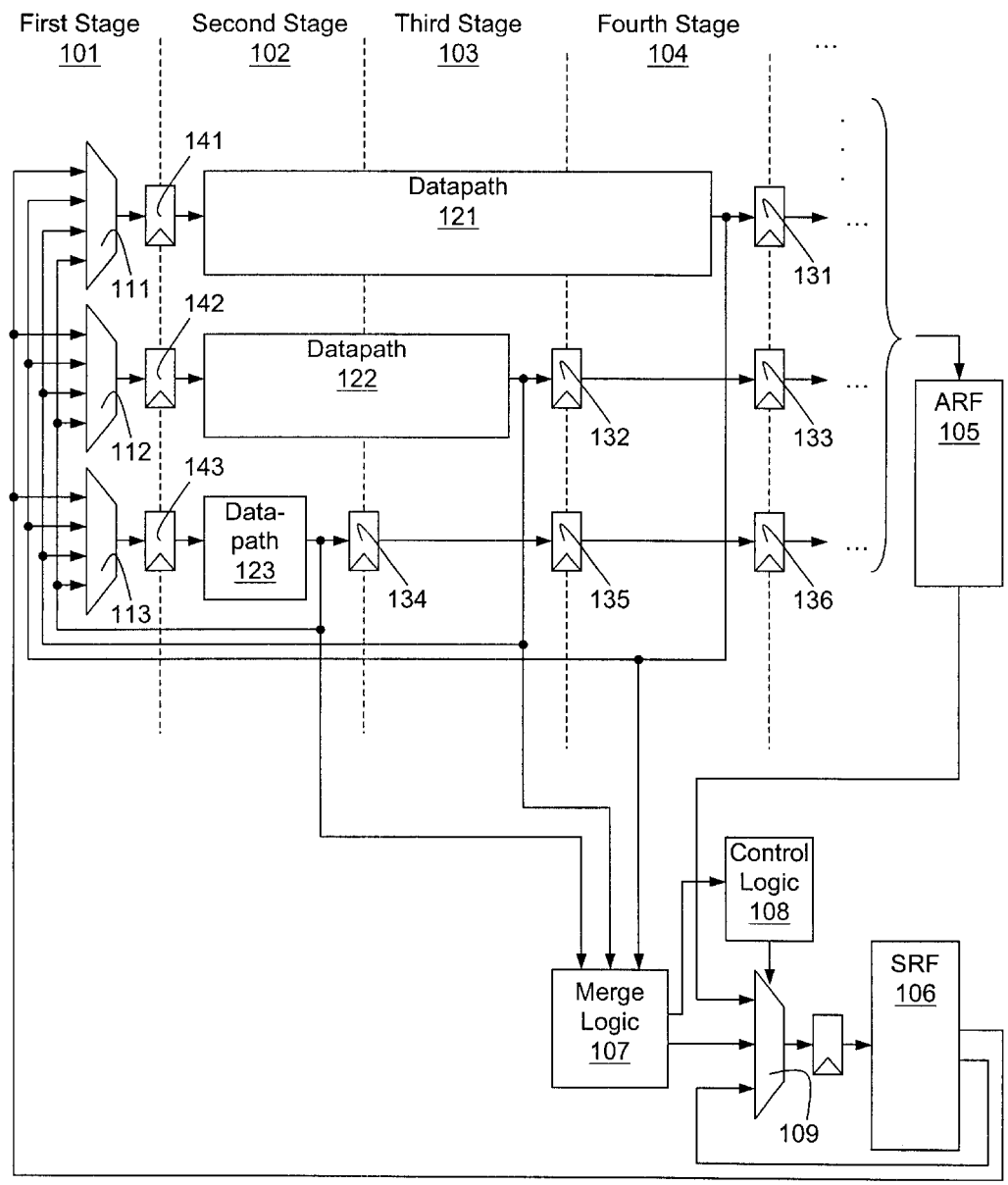
FIG. 1 is a circuit formed in accordance with an embodiment of the present invention.

FIG. 1 is a circuit formed in a portion of a processor pipeline in accordance with an embodiment of the present invention. Through source data latches 141–143, the outputs of multiplexers 111, 112, and 113 are coupled to inputs of datapaths 121, 122, and 123, respectively. The outputs of each of datapaths 121, 122, and 123 are coupled to inputs of each of multiplexers 111, 112, and 113. In addition, the outputs of each of datapaths 121, 122, and 123, are coupled to result data latches 131–136 and to merge logic 107. The result data latches of a retirement stage of the pipeline are coupled to one or more inputs to ARF 105. The output of ARF 105 is coupled to an input of multiplexer 109, as are the outputs of merge logic 107 and SRF 106. Merge logic 107 is coupled to control logic 108, which is coupled to the control gate of multiplexer 109, the output of which is coupled to an input to SRF 106. SRF 106 also includes outputs coupled to each of multiplexers 111, 112, and 113.

Note that as described herein, the ARF and SRF are predicate register files that store predicate values, and latches 131–136 and 141–143 of FIG. 1 also store predicate values. For an alternate embodiment of the present invention, however, the teachings provided herein may be implemented in an ARF and a SRF that are integer (or general purpose), floating point, or any other type of register file or register stack. One or both of the register files may be fully associative, set associative, or a direct-mapped table indexed by register IDs. The SRF may include multiple read ports to support simultaneous read accesses of the SRF.

The datapaths of FIG. 1 may include execution units (such as integer, floating point, memory, or branch resolution), or other types of parallel pipelines (or micro pipelines). For an alternate embodiment of the present invention, a processor may include any number of datapaths spanning any number of pipeline stages up to the retirement stage.

To demonstrate the operation of the circuit of FIG. 1, consider the execution of the following sequence of instructions (p2) compare Ra=Rb→p3

(p4) MTP Rc→p5, p6, p7

The nomenclature used herein will be defined in reference to these instructions. The compare instruction uses source data p2, Ra, and Rb to determine a result for p3. P2 is a qualifying predicate of the compare instruction. A predicate may have one of two values, either "true" (which may be represented by a single bit value of "1" in the associated predicate register) or "false" (which may be represented by a "0"). Although the present invention is explained in reference to these bit value definitions, the bit values may be alternately defined in, for example, a negative logic implementation. If p2 is true, the compare instruction is executed normally. If p2 is false, the compare instruction is not executed or is treated as a no-op such that the results of the instruction are not used to update either the ARF or the SRF. The compare instruction, if executed, compares the value of register Ra to the value of register Rb. If they are equal, the value of predicate p3 is set to true. If they are not equal, the value of predicate p3 is set to false. Note that other types of compare instructions, or other instructions, may be used to determine predicate values. For example, a compare instruction may set the value of one or more predicates based on one register value being greater than, equal to, or less than another register value.

The MTP instruction, which stands for "move to predicate" is predicated on p4. The MTP instruction uses source data p4 and Rc to determine a result for p5, p6, and p7. If p4 is true, the MTP instruction writes to predicates P5, P6, and P7 the values stored at corresponding bit positions of register Rc. Other instructions may also write data directly into one or more predicate registers.

Assume that the compare instruction is evaluated by datapath 122 of FIG. 1, the MTP instruction is evaluated by datapath 123 of FIG. 1, and the two instructions are issued to first stage 101 of FIG. 1 sequentially (e.g. the compare instruction is issued one clock cycle before the MTP instruction). The results of both instructions become available during the same clock cycle. The result of the compare instruction, p3, becomes available during third stage 103, at the output of datapath 122, as the results of the MTP instruction, p5, p6, p7, become available during second stage 102 (which may be the first execution stage of the pipeline), at the output of datapath 123. Note that other results may become available during the same clock cycle in stage 101, 102, 103, 104, or any other stage before the retirement stage of the pipeline. For simplicity, however, this example focuses on the results of the MTP and compare instructions becoming available at the second and third stages of the pipeline, respectively. Result p3 is latched in result data latch 132 of fourth stage 104, and results p5, p6, and p7 are latched in result data latch 134 (which may include multiple latches) of third stage 103.

Results p3, p5, p6, and p7 of the compare and MTP instructions are fed back to first stage 101 (which may be the register read stage) of the pipeline of FIG. 1 via the bypass network including multiplexers 111, 112, and 113. Based on a comparison (not shown) of the predicate IDs of predicates p3, p5, p6, and p7 to the predicate IDs of the sources of the instructions at first stage 101, the values of these predicates may be selected by the multiplexers and provided to second stage 102 for evaluation of subsequent instructions. In addition to being fed back to the first stage of the pipeline, the bypass network also provides the result data of predicates p3, p5, p6, and p7 to merge logic 107 of FIG. 1. (Merge logic 107, control logic 108, SRF 106, and multiplexer 109 are described in greater detail below.) Merge logic 107 provides the result data to multiplexer 109, and as long as the pipeline is not flushed (e.g. no misprediction has been detected), control logic 108 selects this result data for being stored in (i.e. written to) SRF 106. Note that at this point, the result data of predicates p3, p5, p6, and p7 is speculative because the instructions that produced these predicate values have not yet been retired.

After another clock cycle has passed, the result data of predicates p3, p5, p6, and p7 is forwarded to the next stage of the pipeline, and is latched in result data latches 133 and 135 of FIG. 1. By the time the result data is held in latches 133 and 135, the data is stored in SRF 106. Therefore, there is no need to bypass the result data from latches 133 and 135 back to first stage 101. Instead, the speculative p3, p5, p6, and p7 values from SRF 106 are provided to first stage 101 via the bypass network. As a result, the bypass network, particularly the size and speed of multiplexers 111, 112, and 113, is made more efficient. For an alternate embodiment of the present invention, result data is written into SRF in the same clock cycle in which the result data is produced. For this embodiment, the need for a bypass network from any of the pipeline stages may be obviated. Only a bypass from the SRF to the first stage may be needed. For another embodiment, result data takes at least two clock cycles to be written into the SRF. For this embodiment, the bypass network may need to be expanded to bypass result data from multiple stages.

Eventually, the compare and MTP instructions are retired, and the speculative result data for p3, p5, p6, and p7 becomes architectural and is stored in (or written to) ARF 105. If a misspeculation is detected by the processor after the result data for p3, p5, p6, and p7 is stored in SRF 106 but before it is stored in ARF 105, all or a portion of the pipeline is flushed, and a misspeculation signal is asserted in control logic 108. Control logic 108, in turn, selects the ARF data provided to multiplexer 109 to be passed through to SRF 106, thereby updating all the speculative predicate values in SRF 106, including the values for p3, p5, p6, and p7, with architectural values. The signal is then deasserted, and the SRF again functions as described above.

Merge logic 107 of FIG. 1 may be designed to take advantage of the fact that ARF 105 and SRF 106 are only one bit wide for the embodiment in which the ARF and SRF are predicate register file. This embodiment is described below in conjunction with FIGS. 2 and 3.

According to the nomenclature used below, "pn" indicates the value of the associated predicate (where "n" is an integer); pnv indicates the value vector of predicate pn; [pn] indicates the ID of predicate pn; and [pnv] indicates the ID vector of predicate pn. In addition, MTPV indicates the value vector resulting from execution of the MTP instruction, and [MTPv] indicates the ID vector resulting from execution of the MTP instruction. Although the embodiment described below is for predicate register files having 64 entries, the embodiment may be appropriately modified to accommodate register files having any number of entries. For one embodiment of the present invention, vectors pnv, [pnv], MTPv, and [MTPv] may be generated from their associated predicates using a demultiplexer to create a "one-hot" vectored representation of the associated data.

Figure 2:
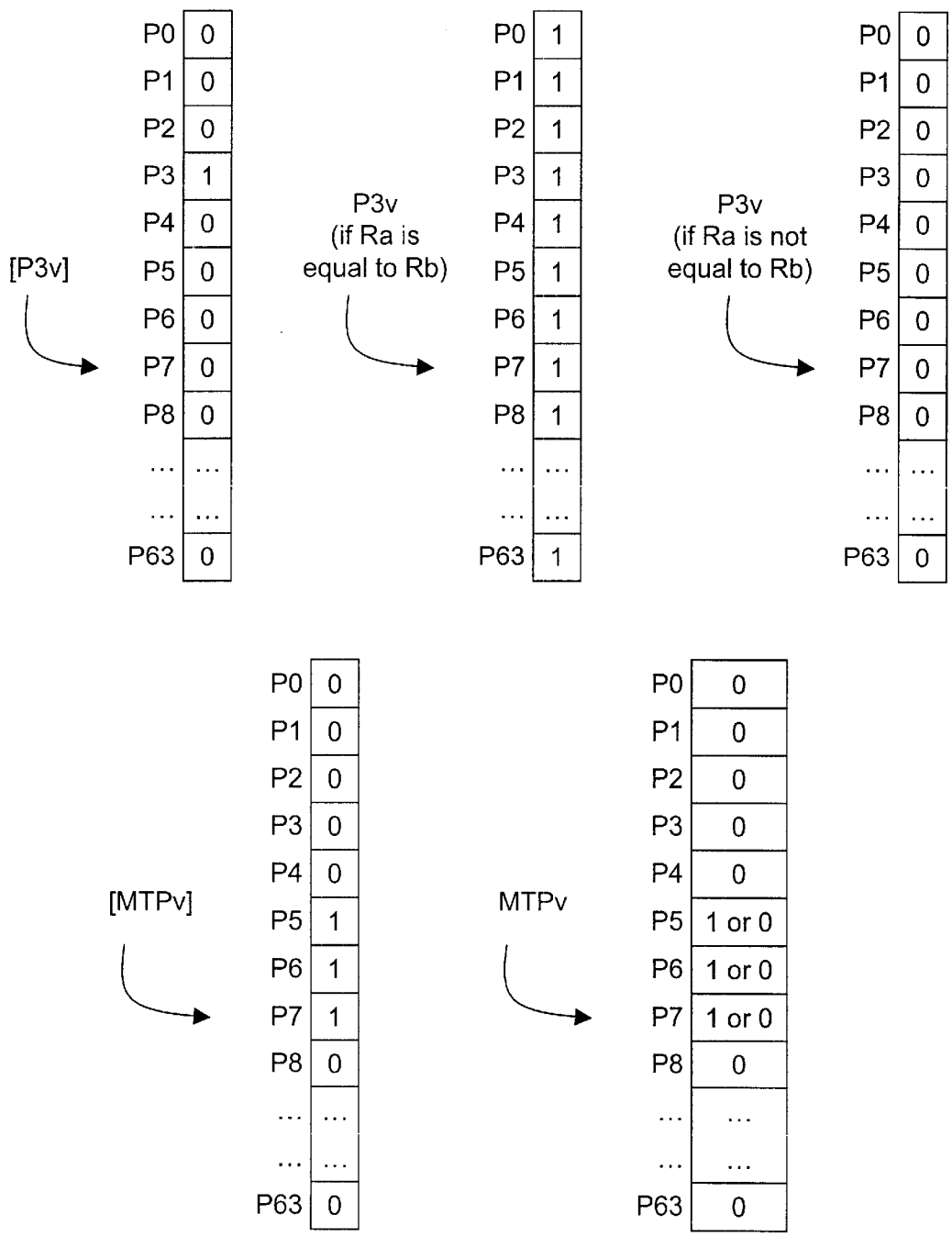
FIG. 2 shows vectors generated in accordance with an embodiment of the present invention.

FIG. 2 shows the predicate ID vector for p3, [p3v], resulting from the execution of the compare instruction set forth above. Also shown in FIG. 2 is the predicate value vector of p3, p3v, for an embodiment in which p3 is true (Ra is equal to Rb), as well as for an embodiment in which p3 is false (Ra is not equal to Rb). For an alternate embodiment, the bit values in the value vectors may be any value, as long as the bit value associated with predicate p3 is set properly.

FIG. 2 further shows the ID vector resulting from the MTP instruction, [MTPv]. Also shown in FIG. 2 is the value vector resulting from the MTP instruction, MTPv, wherein the values associated with each of p5, p6, and p7 depend on the values in the corresponding bit positions of register Rc. For an alternate embodiment of the present invention, MTPv is simply equal to Rc (rather than only the bit values associated with predicates p5, p6, and p7).

To perform the merge function of merge logic 107 of FIG. 1, the value of the "write valid" bit of the compare instruction is ANDed with each bit of the ID vector for predicate p3, [p3v]. For example, if the write valid bit is false, every bit value of [p3v] becomes "0" after being ANDed with the write valid bit. If the write valid bit is true, [p3v] will remain intact. The resulting vector is called the intermediate ID vector, [p3v(i)]. The write valid bit is a function of the controlling predicate, the op-code, and the predicate value associated with the compare instruction. For one embodiment of the present invention, this write valid bit may simply be the controlling predicate of the instruction, which is p2 in the case of the compare instruction.

The value of the write valid bit of the MTP instruction is also ANDed with each bit of ID vector [MTPv] to generate intermediate ID vector [MTPv(i)]. For one embodiment of the present invention, the write valid bit of the MTP instruction is simply the controlling predicate of the instruction, p4. For an embodiment in which additional instruction results are provided to merge logic 107 of FIG. 1 during the same clock cycle that the compare and MTP results are produced, the value of each instruction's write valid bit (which, in accordance with one embodiment of the present invention, is the controlling predicate of the instruction) is ANDed with each bit of the ID vector of any resulting predicates to generate an intermediate ID vector.

All of the resulting intermediate ID vectors are subsequently ORed together on a bit-by-bit basis to generate a write enable vector. For example, the bit in the first position of intermediate ID vector [p3v(i)] is ORed with a corresponding bit in the first position of intermediate ID vector [MTPv(i)] to generate the bit in the first position of the write enable vector (e.g. the bit associated with predicate p0). The bit in the second position of intermediate ID vector [p3v(i)] is ORed with a corresponding bit in the second position of intermediate ID vector [MTPv(i)] to generate the bit in the second position of the write enable vector (e.g. the bit associated with predicate p1). Etc. Each bit of the write enable vector indicates whether or not its associated predicate is being written to in the current clock cycle (e.g. whether a valid predicate result is being produced by an instruction).

Separately, merge logic 107 of FIG. 1 combines, on a bit-by-bit basis, value vector p3v, MTPv, and the value vectors of the predicate results of any additional instruction provided to merge logic 107 during the same clock cycle that the compare and MTP results are produced. The result of this combine function is a vector called a data vector. Each bit of the data vector indicates the value of the associated predicate that is being produced by an instruction in the current clock cycle. For one embodiment of the present invention, this combine function is an OR function. For example, for this embodiment, a bit in the first position of the data vector is generated by ORing the bit in the first position of value vector p3v with the bit in the first position of value vector MTPv.

Figure 3:
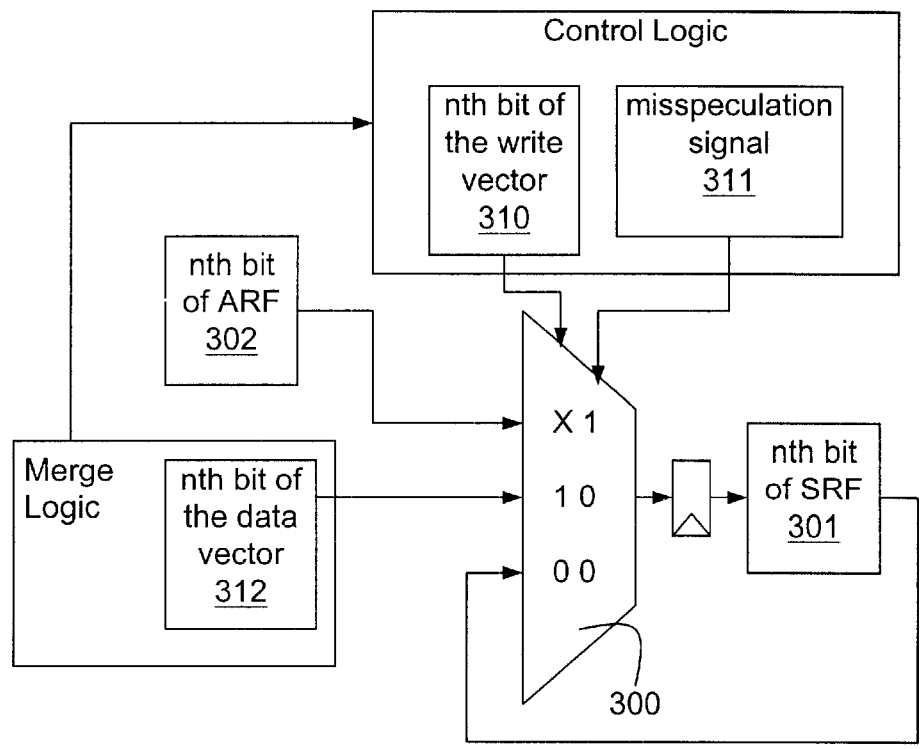
FIG. 3 shows additional detail of a portion of the circuit of FIG. 1.

FIG. 3 includes additional detail of a portion of the circuit of FIG. 1, showing the use of the write enable and data vectors generated by merge logic 107. As shown in FIG. 3, multiplexer 109 of FIG. 1 may be designed as 64 3-bit input/i-bit output multiplexers, each of the 64 multiplexers controlling the value of an associated single bit of the 64 bit long SRF 106. For example, the output of multiplexer 300 of FIG. 3 is coupled to nth bit 301 of SRF 106 via a latch. Each of the other 63 multiplexers associated with each of the remaining 63 bits of 64 bit SRF 106 may be designed in a similar manner, receiving similar input.

According to the control logic, when misspeculation signal 311 of FIG. 3 is asserted, nth bit 302 of ARF 105 is passed through to nth bit 301 of the SRF, thereby updating the associated speculative predicate value with the architectural predicate value from the ARF. In accordance with one embodiment of the present invention, this misspeculation signal is asserted when a misspeculation is detected by the processor. For one embodiment of the present invention, instructions in the pipeline are flushed upon the detection of a misspeculation.

When misspeculation signal 311 of FIG. 3 is unasserted, nth bit 310 of the write enable vector (which is generated by the merge logic as described above) controls the value of nth bit 301 of the SRF. If nth bit 310 of the write enable vector is "1", then nth bit 312 of the data vector (which is generated by the merge logic as described above) is passed through to the SRF, updating (or overwriting) the predicate value associated with nth bit 301 of the SRF. If, however, nth bit 310 of the write enable vector is "0", then nth bit 301 of the SRF is passed through to itself, maintaining the previous value of the associated predicate.

Figure 4:
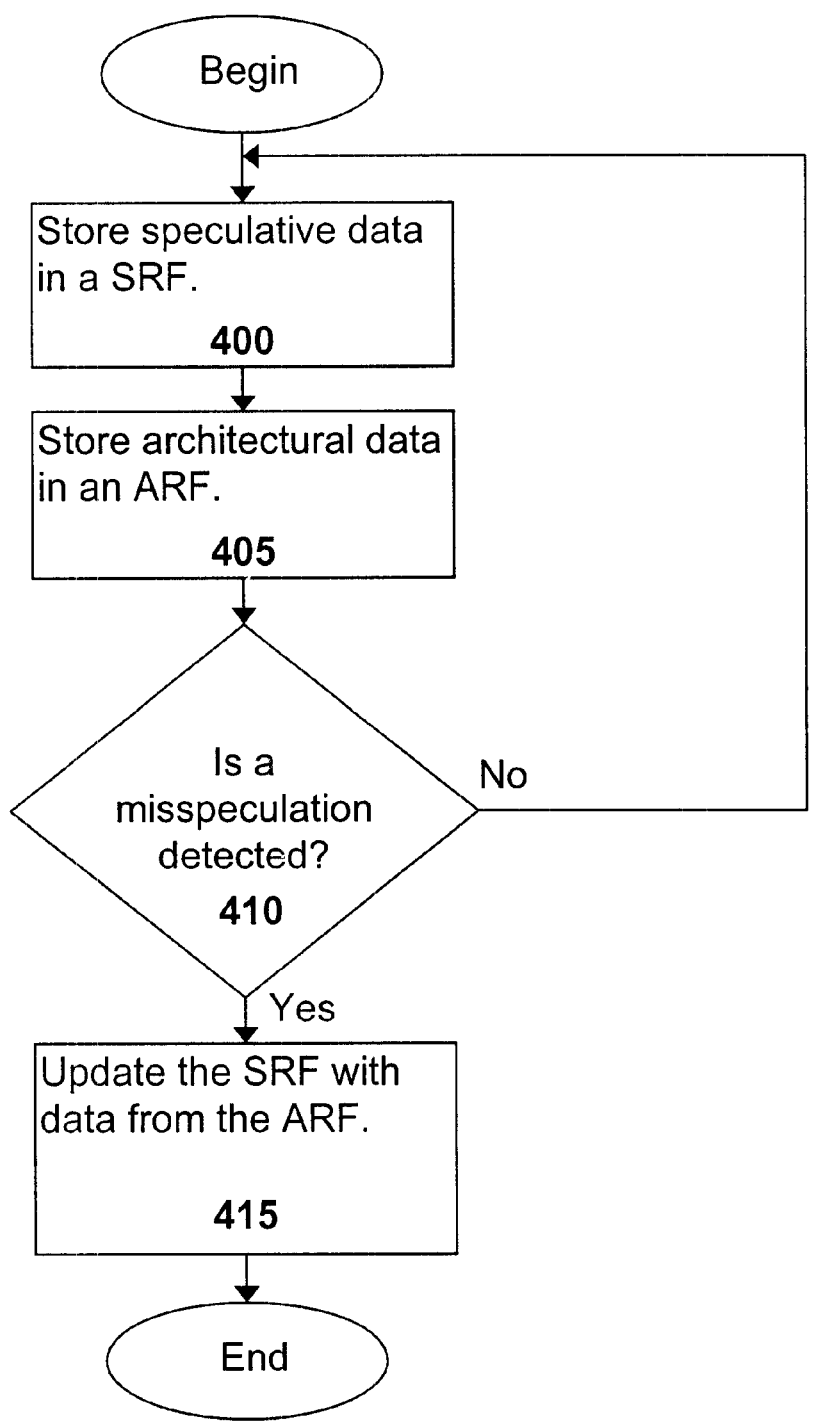
FIG. 4 is a flow chart in accordance with a method of the present invention.

FIG. 4 is a flow chart in accordance with a method of the present invention. At step 400, speculative data is stored in a SRF. The speculative data may be result data from one or more stages of a pipeline of a processor between a register read stage and a retirement stage. This speculative data may be used as source data for instructions at the register read stage (or stages) of the pipeline.

At step 405 of FIG. 4, architectural data is stored in (i.e. retired to) an ARF. The architectural data may be result data from result data latches of a retirement stage of the pipeline. For one embodiment of the present invention, The architectural data from the ARF is only used to update the SRF upon a misspeculation, and not as source data for instructions at the register read stage of the pipeline. For this embodiment, all the source data provided to the register read stage of the processor pipeline is provided via the bypass network because none of the source data comes directly from the ARF.

At step 410 of FIG. 4, if no misspeculation (e.g. a branch or other misprediction) is detected, the processor continues to operate the SRF and ARF as described above. If a misspeculation is detected, data in the SRF is updated with data from the ARF. Additionally, in accordance with one embodiment of the present invention, instructions in the pipeline are flushed upon detecting the misspeculation.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
   a speculative register file (SRF);
   merge logic to receive result data from a plurality of stages of a pipeline via a bypass network and to merge the result data into a data vector;
   an architectural register file (ARF); and
   a multiplexer coupled to an input of the SRF to select data to store in the SRF including architectural data from the output of the ARF, result data from the data vector, and speculative data from the SRF.

2. The processor of claim 1, further comprising control logic coupled to a control input of the multiplexer to select the architectural data in response to receiving a misspeculation signal.

3. The processor of claim 1, wherein the bypass network is to provide data from an output of the SRF to inputs of a plurality of datapaths of the pipeline.

4. The processor of claim 3, wherein the bypass network further provides data from outputs of the plurality of datapaths to the inputs of the plurality of datapaths.

5. The processor of claim 4, further comprising a plurality of multiplexers, each multiplexer of which having an output coupled to each of the inputs of the plurality of datapaths to select source data including the data from the output of the SRF and the data from the outputs of the plurality of datapaths.

6. The processor of claim 4, further comprising a result data latch of a retirement stage of the pipeline, an output of the result data latch being coupled to an input of the ARF.

7. A processor comprising:
   a circuit to generate a write enable vector;
   a circuit to generate a data vector including a speculative predicate value, associated with a first predicate ID, from a first pipeline stage of the processor;
   a speculative register file (SRF) to store the speculative predicate value based on data in the write enable vector; and
   an architectural register file (ARF) to store an architectural predicate value, associated with the first predicate ID, from a second pipeline stage of the processor, the second pipeline stage being later than the first pipeline stage.

8. The processor of claim 7, wherein the first stage is an execute stage and the second stage is a retirement stage.

9. The processor of claim 7, further comprising a bypass network to provide the speculative predicate value to a third pipeline stage of the processor, the third pipeline stage being earlier than the first pipeline stage.

10. The processor of claim 9, wherein the third stage is a register read stage.

11. The processor of claim 9, wherein the bypass network provides the speculative predicate value from the SRF.

12. The processor of claim 9, wherein the bypass network provides the speculative predicate value from the first pipeline stage.

13. The processor of claim 7, further comprising a coupling between an output of the ARF and an input of the SRF to update the speculative predicate value with the architectural predicate value when a misspeculation is detected.

14. The processor of claim 7, further comprising a result data latch of a retirement stage of the processor, an output of the result data latch being coupled to an input of the ARF.

15. A method of providing data to a processor pipeline comprising:
   storing speculative data in a speculative register file (SRF), including generating a write enable vector, generating a data vector, and writing the speculative data from the data vector into the SRF based on data in the write enable vector; and
   storing architectural data in an architectural register file (ARF).

16. The method of claim 15, further comprising providing the speculative data from the SRF to a first stage of the processor pipeline as source data.

17. The method of claim 16, further comprising providing the speculative data from a later stage of the processor pipeline to the first stage as source data.

18. The method of claim 15, wherein storing architectural data includes providing the architectural data from a retirement stage of the processor pipeline to the ARF.

* * * * *

UNITED STATES PATENT AND TRADEMARK OFFICE
CERTIFICATE OF CORRECTION

PATENT NO. : 6,442,678 B1
DATED : August 27, 2002
INVENTOR(S) : Arora

It is certified that error appears in the above-identified patent and that said Letters Patent is hereby corrected as shown below:

Column 5,
Line 18, delete "MTPV", insert -- MTPv --.

Signed and Sealed this

Eighteenth Day of February, 2003

JAMES E. ROGAN
*Director of the United States Patent and Trademark Office*